US005900399A

United States Patent [19]

Seiter et al.

[11] Patent Number: 5,900,399

[45] Date of Patent: May 4, 1999

[54] TABLET CONTAINING BUILDERS

[75] Inventors: Wolfgang Seiter, Neuss; Dieter Jung, Hilden; Otto Koch, Leichlingen; Birgit Stevermann, Gelsenkirchen, all of Germany

[73] Assignee: Henkel Kommanditgesellschaft auf Aktien, Duesseldorf, Germany

[21] Appl. No.: 08/687,550

[22] PCT Filed: Feb. 1, 1995

[86] PCT No.: PCT/EP95/00359

§ 371 Date: Oct. 10, 1996

§ 102(e) Date: Oct. 10, 1996

[87] PCT Pub. No.: WO95/21908

PCT Pub. Date: Aug. 17, 1995

[30] Foreign Application Priority Data

Feb. 10, 1994 [DE] Germany ............................ 44 04 279

[51] Int. Cl.$^6$ .............................. C11D 7/14; C01B 33/32

[52] U.S. Cl. ......................... 510/446; 510/294; 510/298; 510/507; 510/511; 510/531; 510/532; 510/533; 510/534; 210/687; 423/328.2; 423/332

[58] Field of Search .................................... 510/224, 108, 510/534, 294, 298, 446, 507, 511, 533, 531, 532; 210/687; 423/328.2, 332

[56] References Cited

U.S. PATENT DOCUMENTS

| | | | |
|---|---|---|---|
| 3,450,494 | 6/1969 | Gaiser | 23/110 |
| 3,674,700 | 7/1972 | Gaiser | 510/298 |
| 4,370,250 | 1/1983 | Joshi | 510/298 |
| 4,451,386 | 5/1984 | Joshi | 510/298 |
| 4,814,095 | 3/1989 | Puchta et al. | 252/8.6 |
| 4,816,553 | 3/1989 | Baur et al. | 528/245 |
| 4,820,439 | 4/1989 | Rieck | 510/469 |
| 4,897,212 | 1/1990 | Kruse et al. | 510/224 |
| 5,225,100 | 7/1993 | Fry et al. | 510/298 |
| 5,344,581 | 9/1994 | Burzio et al. | 252/95 |
| 5,356,607 | 10/1994 | Just | 423/334 |
| 5,501,814 | 3/1996 | Engelskirchen et al. | 252/174.17 |
| 5,516,447 | 5/1996 | Bauer et al. | 252/89.1 |
| 5,540,855 | 7/1996 | Baillely et al. | 510/276 |

FOREIGN PATENT DOCUMENTS

| | | |
|---|---|---|
| 0164514 | 12/1985 | European Pat. Off. . |
| 0269982 | 6/1988 | European Pat. Off. . |
| 0280223 | 8/1988 | European Pat. Off. . |
| 0504091 | 9/1992 | European Pat. Off. . |
| 0508934 | 10/1992 | European Pat. Off. . |
| 0525239 | 2/1993 | European Pat. Off. . |
| 0628627 | 12/1994 | European Pat. Off. . |
| 0737738 | 10/1996 | European Pat. Off. . |
| 4127323 | 2/1993 | Germany . |
| 4221381 | 2/1994 | Germany . |
| 4300772 | 7/1994 | Germany . |
| 4400024 | 7/1995 | Germany . |
| WO9002165 | 3/1990 | WIPO . |
| WO9108171 | 6/1991 | WIPO . |
| WO9109009 | 6/1991 | WIPO . |
| WO9213937 | 8/1992 | WIPO . |
| WO9308251 | 4/1993 | WIPO . |
| WO9316110 | 8/1993 | WIPO . |

*Primary Examiner*—Douglas J. McGinty
*Assistant Examiner*—Lorna M. Douyon
*Attorney, Agent, or Firm*—Ernest G. Szoke; Wayne C. Jaeschke; Real J. Grandmaison

[57] ABSTRACT

A tablet composition containing 2% to 100% by weight of amorphous crystalline or partly crystalline layer-form sodium silicates corresponding to the formula $Na_2\ Si_x$—$O_{2x+1}.yH_2O$ wherein x is a number of 1.9 to 4 and y is a number of 0 to 20, with the proviso that the tablet composition only contains water in a quantity such that the maximum theoretical water-binding capacity of the components of the composition is not exceeded.

20 Claims, No Drawings

TABLET CONTAINING BUILDERS

BACKGROUND OF THE INVENTION

1. Field of the Invention

This invention relates to tablets, preferably washing- or cleaning-active tablets, more particularly detergent tablets or compounds in tabletted form for detergents, which contain silicate-based builders.

2. Discussion of Related Art

Detergent tablets have a number of advantages over detergent powders, including simple dosing and minimal packaging volume. However, problems arise out of the fact that, to achieve adequate dimensional stability and breaking strength, relatively high pressures have to be applied during the tabletting of the powder-form components. In view of their high compaction, corresponding tablets often show unsatisfactory disintegrating and dissolving properties in use. Further difficulties arise out of the presence of nonionic surfactants. According to the teaching of the International patent application WO-A-90102165, these problems can be solved if at least two granular components are produced before tabletting, most of the anionic surfactants being present in one component and most of the nonionic surfactants being present in the other component. The component containing the anionic surfactants preferably contains up to 20% by weight of anionic surfactants, including soaps, up to 30% by weight of water-containing zeolite, up to 40% by weight of inorganic salts, such as amorphous silicates and carbonates, up to 5% by weight of polycarboxylates, up to 20% by weight of sulfate and up to at most 5% by weight of water which is not fixed to the zeolite. The last three items apply equally to the second component which, in a preferred embodiment, additionally contains up to 15% by weight of nonionic surfactants, up to 20% by weight of water-containing zeolite and up to 10% by weight of soda. Other components, for example containing bleaching agents and/or enzymes, are also optionally present.

Crystalline layer-form sodium silicates having the formula $NaMSi_xO_{2x+1}.yH_2O$, where M is sodium or hydrogen, x is a number of 1.9 to 4 and y is a number of 0 to 20, preferred values for x being 2, 3 or 4, can replace phosphates and zeolites. Corresponding crystalline layer silicates are described, for example, in European patent application EP-A-0 164 514. Preferred crystalline layer silicates are those in which M stands for sodium and x assumes a value of 2 or 3. Both β- and δ-sodium disilicates $Na_2Si_2O_5.yH_2O$ are particularly preferred, β-sodium disilicate being obtainable, for example, by the process described in International patent application WO-A-91/08171. β-Sodium disilicate is commercially available under the name of SKS 7® while δ-sodium disilicate is commercially available under the name of SKS 6® (both products of Hoechst AG, Federal Republic of Germany). These powders generally have an apparent density below 600 g/l and large fine-particle components, normally of more than 30% by weight, with a particle size below 0.1 mm. Since crystalline layer silicates undergo losses in their effect as builders during the spray drying of detergent-containing slurries, presumably as a result of the partial destruction of their crystalline structure, they should preferably be incorporated in detergents or cleaning formulations by other methods. However, in view of their large fine-particle component and hence their dust-like structure, these powders are also unsuitable for use as a component to be mixed with other granular components of detergents. In the granulation of crystalline layer-form sodium silicates, damage can be caused to equipment on account of the highly abrasive properties of these silicates. This means on the one hand that process safety is endangered and additional inspections of the mixing and granulating tools are necessary and, on the other hand, that the silicate-based product can be contaminated with traces of metals, especially heavy metals, through the erosion of material. It is desirable for ecological reasons to keep the contamination of the end product to a minimum. In addition, it is known to the expert that, for example, the stability of peroxy bleaching agents is adversely affected by heavy metals.

Although amorphous alkali metal silicates, more especially those with a molar $M_2O:SiO_2$ ratio of 1:1.9 to 1:4.0, where M is preferably sodium and/or potassium, can generally be spray-dried, the expert knows that the spray drying of slurries containing zeolite in addition to the amorphous silicates can be accompanied by negative interactions so that the exchange capacity of the zeolite is reduced and deposits can form on the washing from which they are difficult to remove. By contrast, granules with a high percentage content of amorphous silicates or pure spray-dried or granulated amorphous silicates are hygroscopic so that they have to be specially protected against atmospheric moisture in storage.

Accordingly, a first problem addressed by the invention was to provide an advantageous form of presentation for products containing amorphous and/or crystalline silicates. In this connection, both process safety and the stability of the other constituents present, if any, would be increased, in addition to which the builder properties would remain intact. Another problem addressed by the invention was to provide builder-containing formulations which would be sufficiently soluble or dispersible for the application envisaged.

According to the invention, these problems have been solved by a formulation with a relatively small specific surface which can be produced with a low water content.

DESCRIPTION OF THE INVENTION

Accordingly, the present invention relates to a tablet containing builders, the tablet according to the invention containing amorphous, partly crystalline and/or crystalline layer-form sodium silicates with the formula $Na_2Si_xO_{2x+1}.yH_2O$ in quantities of 2 to 100% by weight and x being a number of 1.9 to 4 and y being a number of 0 to 20, preferred values for x being 2, 3 or 4, with the proviso that the tablet only contains water in such quantities that the maximum theoretical water-binding capacity of the ingredients is not exceeded.

The maximum theoretical water-binding capacity can be determined as described in the following. Certain constituents of the tablets form stable hydrates at an assumed storage temperature of 15 to 45° C. This applies, for example, to zeolite. By contrast, such constituents as sodium sulfate and polymeric polycarboxylates are counted as water-free substances although it is known that they are generally present in hydrated form in granules. Crystalline layer-form sodium disilicates are also counted as water-free whereas amorphous sodium silicates, for example, can have a water content of up to about 22% by weight. The sum total of the water of crystallization contents from the stable hydrates gives the maximum theoretical water content of the tablet according to the invention. It may even be preferable in this regard for the tablet to be present in overdried form, i.e. to contain less water than corresponds to the maximum theoretical water-binding capacity or than can be stably absorbed by the tablet ingredients.

The tablets may be produced by mixing the amorphous, partly crystalline and/or crystalline layer-form sodium silicates and optionally all other constituents in a mixer and tabletting the resulting mixture in conventional tablet presses, for example eccentric presses, hydraulic presses or rotary presses, under pressures of 1 to 300 bar, advantageously in the range from about 5 to 200 bar and more especially in the range from 10 to 150 bar. Tabletting is preferably carried out with no addition of water. In one preferred embodiment of the invention, however, the compounds to be tabletted are prepared by mixing the individual ingredients which are at least partly made up beforehand into a granular compound. These include, for example, roll-compacted crystalline layer-form or amorphous sodium disilicates which have optionally been impregnated with liquid to wax-like components, for example nonionic surfactants. Making up in the absence of water, which is particularly advantageous, is made possible in this way. Breaking-resistant tablets which still dissolve sufficiently quickly under in-use conditions are obtained in this way. The tabletting conditions are normally optimized in such a way that the required solubility of the tablet is combined with satisfactory strength or hardness. It is well known that relatively high tabletting pressures result in a reduction in tablet solubility. Preferred tablets have a breaking strength of at least 55 N and, more particularly, at least 60 N. Tablets with breaking strengths above 150 N are also possible.

Tools coated with hard plastic, in the same way as uncoated tools, give tablets with smooth surfaces so that, in most cases, there is no need to coat the punches with soft plastic. However, the tabletting tools are preferably made of a high-strength material.

The tablet may assume virtually any appropriate easy-to-handle shape providing it meets the requirement that contact with the tabletting machine during the production process is relatively minimal. Cylindrical shapes with oval or circular cross sections of the type described below are preferred. A tablet thus produced preferably weighs from 10 to 120 g and, more particularly, from 20 to 100 g, the tablets normally being smaller than 100 mm in diameter. Preferred detergent tablets have a diameter of at most 80 mm and, more particularly, from 30 to 80 mm. However, it is also possible and—particularly with improved solubilities in mind—preferred to use several, i.e. at least two, tablets with the same composition or with different compositions. These tablets preferably weigh from 10 to 40 g and preferably have diameters of 20 to 50 mm. The diameter-to-height ratio of the tablets should be optimized to the extent that minimal abrasion on the vertical walls of the tabletting press (large diameter/small height) with sufficient stability and not too large a surface (small diameter/large height) is guaranteed. Preferred diameter-to-height ratios of the cylindrical tablets are about 0.5:1 to 10:1 and, more particularly, 1:1 to 8:1.

The content of amorphous, partly crystalline and/or crystalline layer-form sodium silicates in the tablets can vary over a wide range. The quantities actually used depend upon the field of application in which the tablet is to be used. If the tablet is to be used as a tabletted detergent, preferred contents of amorphous, partly crystalline and/or crystalline layer-form sodium silicates are from 5 to 60% by weight and, more preferably, from 10 to 40% by weight. However, if such tablets are only to be used as a compound and, more particularly, as water-softening tablets, preferred contents of amorphous, partly crystalline and/or crystalline layer-form sodium silicates are 20 to 80% by weight and, more preferably, 30 to 60% by weight. The same also applies to bleaching tablets, i.e. tablets which are to be added to a wash liquor as bleach boosters.

Of the crystalline layer-form sodium silicates, the low-water to water-free disilicates are particularly preferred. Preferred amorphous silicates include, above all, the known spray-dried waterglasses with a ratio by weight of $Na_2O$ to $SiO_2$ of 1:1.9 to 1:3.35. A preferred embodiment of silicates are silicate/carbonate compounds, for example those according to European patent applications EP-A-0 488 868 and EP-A-0 561 565. Compounds such as these are commercially available under the name of Nabion 15® (a product of Rhône-Poulenc). However, a particularly preferred embodiment of silicates are the X-ray-amorphous silicates described in earlier German patent application P 44 00 024.3. Accordingly, preferred tablets are tablets which contain either crystalline layer-form sodium silicates of the type mentioned or X-ray-amorphous silicates of the type mentioned or tablets which contain crystalline layer-form sodium silicates and X-ray-amorphous silicates in a ratio by weight of 10:1 to 1:10. Particularly preferred tablets are free from typical amorphous silicates of the waterglass type or contain these amorphous silicates of the waterglass type only in combination with crystalline layer-form sodium silicates and/or X-ray-amorphous silicates, the content of amorphous silicates of the waterglass type advantageously not exceeding 20% by weight and, more particularly, 15% by weight, based on the total quantity of silicates present in the tablet.

The tablets may contain up to 98% by weight of other ingredients of detergents or cleaning formulations. In a particularly preferred embodiment, the tablets contain typical tabletting aids and/or disintegrating agents.

Disintegrating agents are auxiliaries which positively influence the dissolving or disintegration process in the aqueous in-use phase. These disintegrating agents may be inorganic and/or organic in character. Typical inorganic disintegrating agents are, for example, swellable layer silicates, such as bentonites. Organic disintegrating agents may be natural substances based on starch or cellulose or derivatives thereof, for example crosslinked potato starch, microcrystalline cellulose powder, but especially typical ingredients of detergents or cleaning formulations, such as the salts of polymeric polyacrylates or polymethacrylates, for example those with a low relative molecular weight of 1,000 to 5,000, and also methyl celluloses and/or hydroxypropyl celluloses or methyl hydroxypropyl celluloses.

Other examples are acetates or percarbonates. Percarbonates are preferably used in bleach-containing tablets or are directly incorporated in bleaching tablets. Corresponding disintegrating agents are normally used in quantities of up to about 15% by weight, based on the tablet. By virtue of the use of water-soluble silicates, it is generally sufficient to use the disintegrating agents in quantities well below 10% by weight and preferably in quantities of up to 5% by weight and, more particularly, even lower in the tablets according to the invention. Where poly(meth)acrylates and/or nonionic cellulose ethers are used, quantities of only around 1% by weight generally lead to very good results.

In contrast to the disintegrating agents, tabletting aids provide for better cohesion between the individual powder-form or granular components and thus contribute to the stability of the tablet. However, there are a large number of disintegrating agents which also act as tabletting aids or binders. These include, for example, starch, starch and cellulose derivatives and also gelatine and polyvinyl pyrrolidone. Other preferred binders are, for example, nonionic surfactants which are liquid to paste-like at the processing temperature.

The disintegrating agents and tabletting aids are preferably used in dry form or are dissolved or suspended in a nonionic surfactant. They are preferably not dissolved in water because water may only be added in such quantities during the process that the maximum theoretical water-binding capacity of the tablet ingredients is not exceeded. In one particularly preferred embodiment of the invention, therefore, no ingredient is used in the form of an aqueous solution or suspension so that the tabletting process is carried out with no addition of water.

In one preferred embodiment of the invention, the tablets contain in particular other typical builders. These include inorganic builders, such as zeolite and/or phosphates, or even organic builders, such as polycarboxylates and/or polymeric polycarboxylates.

Preferred tablets contain 0.5 to 98% by weight of water-containing zeolite and/or phosphates, the phosphate content preferably being limited to at most 50% by weight and, more particularly, to at most 30% by weight. However, a water-softening tablet, which represents a preferred embodiment of the invention, contains 0 to 80% by weight, preferably 5 to 80% by weight and more preferably 10 to 60% by weight of water-containing zeolite and/or phosphate. By contrast, bleaching tablets are preferably free from zeolite in order to rule out negative interactions, although they may optionally contain phosphates.

The finely crystalline, synthetic zeolite containing bound water used in accordance with the invention is preferably detergent-quality zeolite NaA. However, zeolite NaX, zeolite P and mixtures of A, X or P are also suitable. The zeolite may be used either as a spray-dried powder or as a granular compound containing, for example, up to about 50% by weight of other constituents, such as nonionic surfactants, cellulose ethers and/or polymeric polycarboxylates. Suitable powder-form zeolites have an average particle size below 10 $\mu$m (volume distribution, as measured by the Coulter Counter method) and preferably contain 18 to 22% by weight and, more preferably, 20 to 22% by weight of bound water.

In another preferred embodiment of the invention, the tablets contain 0.5 to 50% by weight of organic builders, such as polycarboxylates and/or polymeric polycarboxylates and also acids thereof. Water-softening tablets preferably contain 0 to 50% by weight, more preferably 0.5 to 30% by weight and advantageously 2 to 20% by weight of polycarboxylates and, in addition, 0 to 15% by weight, more preferably 0.5 to 12% by weight and advantageously 1 to 10% by weight of polymeric polycarboxylates. The polycarboxylic acids or the polycarboxylates include in particular the polycarboxylic acids used in the form of their sodium salts, such as citric acid, adipic acid, succinic acid, glutaric acid, tartaric acid, sugar acids and mixtures thereof. Suitable polymeric polycarboxylates are, for example, the sodium salts of polyacrylic acid or polymethacrylic acid, for example those having a relative molecular weight of 800 to 150,000 (based on acid). Suitable copolymeric polycarboxylates are, in particular, those of acrylic acid with methacrylic acid and those of acrylic acid or methacrylic acid with maleic acid. Copolymers of acrylic acid with maleic acid containing 50 to 90% by weight of acrylic acid and 50 to 10% by weight of maleic acid have proved to be particularly suitable. Their relative molecular weight, based on free acids, is generally in the range from 5,000 to 200,000, preferably in the range from 10,000 to 120,000 and more preferably in the range from 50,000 to 100,000. Terpolymeric polycarboxylates, for example those containing as monomers salts of acrylic acid and maleic acid and also vinyl alcohol or vinyl alcohol derivatives (DE-A-43 00 772) or salts of acrylic acid and 2-alkyl allyl sulfonic acid and also sugar derivatives (DE-C-42 21 381) are also particularly preferred.

The (co)polymeric polycarboxylates are preferably used either in powder form or in the form of a granular compound. Suitable granular compounds are, for example, those known from International patent application WO-A-92/13937.

Other suitable builder systems are oxidation products of carboxyfunctional polyglucosans and/or water-soluble salts thereof which are described, for example, in International patent application WO-A-93/08251 or of which the production is described, for example, in International patent application WO-A-93/16110.

Other suitable builders are polyacetals which may be obtained by reaction of dialdehyde with polyol carboxylic acids containing 5 to 7 carbon atoms and at least three hydroxyl groups, for example as described in European patent application EP-A-0 280 223. Preferred polyacetals are obtained from dialdehydes, such as glyoxal, glutaraldehyde, terephthalaldehyde and mixtures thereof and from polyol carboxylic acids, such as gluconic acid and/or glucoheptonic acid.

In another preferred embodiment of the invention, the tablets contain up to 40% by weight of anionic surfactants and/or soaps. The anionic surfactants used are, for example, those of the sulfonate and sulfate type.

Preferred surfactants of the sulfonate type are $C_{9-13}$ alkyl benzene sulfonates, olefin sulfonates, i.e. mixtures of alkene and hydroxyalkane sulfonates, and also the disulfonates obtained, for example, from $C_{12-18}$ monoolefins with a terminal or internal double bond by sulfonation with gaseous sulfur trioxide and subsequent alkaline or acidic hydrolysis of the sulfonation products.

Alkane sulfonates obtained from $C_{12-18}$ alkanes, for example by sulfochlorination or sulfoxidation and subsequent hydrolysis or neutralization, are also suitable.

The esters of $\alpha$-sulfofatty acids (ester sulfonates), for example the $\alpha$-sulfonated methyl esters of hydrogenated coconut oil, palm kernel oil or tallow fatty acids, are also suitable.

Other suitable anionic surfactants are sulfonated fatty acid glycerol esters. Fatty acid glycerol esters are the mono-, di- and triesters and mixtures thereof obtained where production is carried out by esterification of a monoglycerol with 1 to 3 moles of fatty acid or in the transesterification of triglycerides with 0.3 to 2 moles of glycerol. Preferred sulfonated fatty acid glycerol esters are the sulfonation products of saturated fatty acids containing 6 to 22 carbon atoms, for example of caproic acid, caprylic acid, capric acid, myristic acid, lauric acid, palmitic acid, stearic acid or behenic acid. If fats and oils, i.e. natural mixtures of different fatty acid glycerol esters, are used as the starting material, they have to be largely saturated with hydrogen in known manner, i.e. hydrogenated to iodine values below 5 and advantageously below 2, before the sulfonation. Typical examples of suitable starting materials are palm oil, palm kernel oil, palm stearin, olive oil, rapeseed oil, coriander oil, sunflower oil, cottonseed oil, peanut oil, linseed oil, lard oil or lard. However, it has proved to be of particular advantage to use coconut oil, palm kernel oil or beef tallow as starting materials by virtue of their high natural content of saturated fatty acids. The sulfonation of the saturated fatty acids containing 6 to 22 carbon atoms or the mixtures of fatty acid glycerol esters with iodine values below 5 which contain $C_{6-22}$ fatty acids is preferably carried out by reaction with gaseous sulfur trioxide and subsequent neutralization with aqueous bases, as described in International patent application WO-A-91/09009.

Preferred alk(en)yl sulfates are the sulfuric acid semiesters of $C_{12-18}$ fatty alcohols, for example cocofatty alcohol, tallow fatty alcohol, lauryl, myristyl, cetyl or stearyl alcohol, or the $C_{10-20}$ oxoalcohols and sulfuric acid semiesters of secondary alcohols with the same chain length. Other preferred alk(en)yl sulfates are those with the chain length mentioned which contain a synthetic linear alkyl chain produced on a petrochemical basis which is similar in its degradation behavior to corresponding compounds based on oleochemical raw materials. $C_{16-18}$ alk(en)yl sulfates are of particular interest from the point of view of the washing process. It can also be of particular advantage, particularly for machine detergents, to use the $C_{16-18}$ alk(en)yl sulfates in combination with low-melting anionic surfactants and, more particularly, with anionic surfactants which have a relatively low Krafft point and which show only a slight tendency towards crystallization at relatively low washing temperatures, for example from room temperature to 40° C. In one preferred embodiment of the invention, therefore, the detergents contain mixtures of short-chain and long-chain fatty alkyl sulfates, preferably mixtures of $C_{12-14}$ fatty alkyl sulfates or $C_{12-18}$ fatty alkyl sulfates with $C_{16-18}$ fatty alkyl sulfates and, more particularly, $C_{12-16}$ fatty alkyl sulfates with $C_{16-18}$ fatty alkyl sulfates. In another preferred embodiment of the invention, however, not only saturated alkyl sulfates, but also unsaturated alkenyl sulfates with an alkenyl chain length of preferably $C_{16}$ to $C_{22}$ are used. Mixtures of saturated sulfonated fatty alcohols consisting predominantly of $C_{16}$ and unsaturated sulfonated fatty alcohols consisting predominantly of $C_{18}$, for example those derived from solid or liquid fatty alcohol mixtures of the HD-Ocenol® type (a product of Henkel KGaA), are particularly preferred. Ratios by weight of alkyl sulfates to alkenyl sulfates of 10:1 to 1:2 and, more particularly, around 5:1 to 1:1 are preferred.

The sulfuric acid monoesters of straight-chain or branched $C_{7-21}$ alcohols ethoxylated with 1 to 6 moles of ethylene oxide, such as 2-methyl-branched $C_{9-11}$, alcohols containing on average 3.5 moles of ethylene oxide (EO) or $C_{12-18}$ fatty alcohols containing 2 to 4 EO, are also suitable. On account of their high foaming power, they are only used in relatively small quantities in detergents, for example in quantities of 1 to 5% by weight.

Other preferred anionic surfactants are the salts of alkyl sulfosuccinic acid, which are also known as sulfosuccinates or sulfosuccinic acid esters, and the monoesters and/or diesters of sulfosuccinic acid with alcohols, preferably fatty alcohols and, more preferably, ethoxylated fatty alcohols. Preferred sulfosuccinates contain $C_{8-18}$ fatty alcohol radicals or mixtures thereof. Particularly preferred sulfosuccinates contain a fatty alcohol radical derived from ethoxylated fatty alcohols which, considered in isolation, are nonionic surfactants (for a description, see below). Sulfosuccinates of which the fatty alcohol radicals are derived from narrow-range ethoxylated fatty alcohols are particularly preferred. Alk(en)yl succinic acid preferably containing 8 to 18 carbon atoms in the alk(en)yl chain or salts thereof may also be used.

Preferred anionic surfactant mixtures contain combinations of alk(en)yl sulfates, more particularly mixtures of saturated and unsaturated fatty alk(en)yl sulfates, and alkyl benzene sulfonates, sulfonated fatty acid glycerol esters and/or $\alpha$-sulfofatty acid esters. Mixtures containing alk(en)yl sulfates and alkyl benzene sulfonates, alk(en)yl sulfates and $\alpha$-sulfofatty acid methyl esters and/or sulfonated fatty acid glycerol esters as anionic surfactants are particularly preferred.

Other anionic surfactants which may be used in accordance with the invention are, in particular, soaps, preferably in quantities of 0.1 to 5% by weight. Suitable soaps are, for example, saturated fatty acid soaps, such as the salts of lauric acid, myristic acid, palmitic acid or stearic acid, soap mixtures derived in particular from natural fatty acids, for example coconut oil, palm kernel oil or tallow fatty acids. Soap mixtures of which 50 to 100% by weight consist of saturated $C_{12-24}$ fatty acid soaps and 0 to 50% by weight of oleic acid soap are particularly preferred.

The anionic surfactants and soaps may be present in the form of their sodium, potassium or ammonium salts and as soluble salts of organic bases, such as mono-, di- or triethanolamine. The anionic surfactants are preferably present in the form of their sodium or potassium salts, more especially in the form of their sodium salts.

Preferred nonionic surfactants are alkoxylated, advantageously ethoxylated, more especially primary, alcohols preferably containing 8 to 18 carbon atoms and, on average, 1 to 12 moles of ethylene oxide (EO) per mole of alcohol, in which the alcohol radical may be linear or preferably 2-methyl-branched or may contain linear and methyl-branched radicals in the form of the mixtures typically present in oxoalcohol radicals. However, alcohol ethoxylates with linear radicals of alcohols of native origin containing 12 to 18 carbon atoms, for example of cocoalcohol, palm alcohol, tallow fatty alcohol or oleyl alcohol, and an average of 2 to 8 EO per mole of alcohol are particularly preferred. Preferred ethoxylated alcohols include, for example, $C_{12-14}$ alcohols containing 3 EO or 4 EO, $C_{9-11}$ alcohol containing 7 EO, $C_{13-15}$ alcohols containing 3 EO, 5 EO, 7 EO or 8 EO, $C_{12-18}$ alcohols containing 3 EO, 5 EO or 7 EO and mixtures thereof, such as mixtures of $C_{12-14}$ alcohol containing 3 EO and $C_{12-18}$ alcohol containing 5 EO. The degrees of ethoxylation shown are statistical mean values which, for a special product, may be a whole number or a broken number. Preferred alcohol ethoxylates have a narrow homolog distribution (narrow range ethoxylates, NRE). In addition to these nonionic surfactants, fatty alcohols containing more than 12 EO, for example those containing up to about 80 EO, may also be used. Examples of such fatty alcohols are tallow fatty alcohol containing 14 EO, 25 EO, 30 EO or 40 EO.

In addition, alkyl glycosides corresponding to the general formula $RO(G)_x$, where R is a primary saturated or methyl-branched, more especially 2-methyl-branched, aliphatic radical containing 8 to 22 and preferably 12 to 18 carbon atoms and the G stands for a glycose unit containing 5 to 6 carbon atoms, preferably glucose, may also be used as further nonionic surfactants. The degree of oligomerization x, which indicates the distribution of monoglycosides and oligoglycosides, is a number of 1 to 10 and preferably a number of 1.2 to 1.4.

Nonionic surfactants of the amine oxide type, for example N-cocoalkyl-N,N-dimethylamine oxide and N-tallow alkyl-N,N-dihydroxyethylamine oxide, and the fatty acid alkanolamide type are also suitable. The quantity in which these nonionic surfactants are used is preferably no more than the quantity in which the ethoxylated fatty alcohols are used and, more preferably, no more than half that quantity.

Other suitable surfactants are polyhydroxyfatty acid amides corresponding to formula (I):

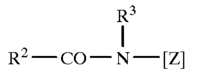

(I)

in which $R^2CO$ is an aliphatic acyl radical containing 6 to 22 carbon atoms, $R^3$ is hydrogen, an alkyl or hydroxyalkyl radical containing 1 to 4 carbon atoms and [Z] is a linear or branched polyhydroxyalkyl radical containing 3 to 10 carbon atoms and 3 to 10 hydroxyl groups.

In one preferred embodiment, the tablets contain the nonionic surfactants in quantities of up to 20% by weight.

Other preferred ingredients are inorganic salts which show an alkaline reaction in water and which are preferably present in the tablets in quantities of up to 15% by weight. These inorganic alkaline salts include, in particular, bicarbonates, carbonates or mixtures thereof. Alkali metal carbonate and, above all, sodium carbonate are preferably used.

The tablets may also contain inorganic salts reacting neutrally in water, preferably sulfates and chlorides, more especially in the form of their sodium and/or calcium salts. The content in the tablets is preferably up to about 20% by weight.

In another embodiment, the present invention relates to water-softening tablets containing 0 to 30% by weight, preferably 0.5 to 20% by weight and more preferably 2 to 15% by weight of the above-mentioned anionic surfactants, nonionic surfactants, alkaline or neutral inorganic salts or mixtures thereof.

Other important ingredients of tablets include, in particular, peroxy bleaching agents and bleach activators. Among the compounds yielding $H_2O_2$ in water which serve as bleaching agents, sodium perborate tetrahydrate and sodium perborate monohydrate are particularly important. Other useful bleaching agents are, for example, sodium percarbonate, peroxy-pyrophosphates, citrate perhydrates and $H_2O_2$-yielding peracidic salts or peracids, such as perbenzoates, peroxyphthalates, diperazelaic acid or diperdodecanedioic acid. Peroxy bleaching agents containing 10 to 20% of active oxygen per mole of the component are particularly preferred. The content of bleaching agents in the tablets is preferably 15 to 60% by weight and, more preferably, 10 to 50% by weight, perborate monohydrate advantageously being used.

In order to obtain an improved bleaching effect where washing is carried out at temperatures of 60° C. or lower, bleach activators may be incorporated in the preparations. Examples of bleach activators are N-acyl or O-acyl compounds which form organic peracids with $H_2O_2$, preferably N,N'-tetraacylated diamines, also carboxylic anhydrides and esters of polyols, such as glucose pentaacetate. Other known bleach activators are the acetylated mixtures of sorbitol and mannitol which are described, for example, in European patent application EP-A-0 525 239. The content of bleach activators in the bleach-containing tablets is in the usual range, preferably between 1 and 10% by weight and, more preferably, between 3 and 8% by weight. Particularly preferred bleach activators are N,N,N',N'-tetraacetyl ethylenediamine (TAED), 1,5-diacetyl-2,4-dioxohexahydro-1,3,5-triazine (DADHT) and acetylated sorbitol/mannitol mixtures (SORMAN). The bleach activators may also be used in particular as a granular compound in the tabletting process.

Bleaching detergent tablets contain peroxy bleaching agents in quantities of, preferably, 5 to 30% by weight and, more preferably, 10 to 25% by weight. However, tablets which are used as bleaching tablets, i.e. as bleach boosters, in addition to other detergent formulations optionally present in tablet form, contain peroxy bleaching agents in quantities of preferably 20 to 50% by weight and, more preferably, 25 to 45% by weight. A percarbonate content of 10 to 40% by weight can be particularly advantageous in cases where other peroxy bleaching agents are used, particularly for low percarbonate contents below 20% by weight. A preferred bleaching tablet is characterized in that it contains 20 to 80% by weight and preferably 30 to 60% by weight of amorphous, partly crystalline and/or crystalline layer-form sodium silicates corresponding to the above formula and 20 to 50% by weight and preferably 25 to 45% by weight of peroxy bleaching agent, but no zeolite.

The tablets may also contain other ingredients of detergents or cleaners. These include typical soil-release and soil-repellent compounds and also solubility improvers, redeposition inhibitors, foam inhibitors, optical brighteners, enzymes, fabric softeners, dyes and perfumes. Their content in the tablets according to the invention preferably does not exceed 10% by weight.

Accordingly, the detergents/cleaning formulations may also contain components with a positive effect on the removability of oil and fats from textiles by washing. This effect becomes particularly clear when a textile which has already been repeatedly washed with a detergent according to the invention containing this oil- and fat-dissolving component is soiled. Preferred oil- and fat-dissolving components include, for example, nonionic cellulose ethers, such as methyl hydroxypropyl cellulose containing 15 to 30% by weight of methoxyl groups and 1 to 15% by weight of hydroxypropoxyl groups, based on the nonionic cellulose ether, and the polymers of phthalic acid and/or terephthalic acid known from the prior art or derivatives thereof, more particularly polymers of ethylene terephthalates and/or polyethylene glycol terephthalates.

In addition, the tablets may contain constituents which have a positive effect on the solubility of individual constituents of the tablets and hence on the dissolving rate of the tablets. In addition to the fatty alcohols containing 10 to 80 moles of ethylene oxide per mole of fatty alcohol already described, preferred additional constituents are, in particular, polyethylene glycols with a relative molecular weight of 200 to 4,000.

Where the detergents are used in machine washing processes, it can be of advantage to add typical foam inhibitors to them. Suitable foam inhibitors are, for example, soaps of natural or synthetic origin with a high percentage content of $C_{18-24}$ fatty acids. Suitable non-surface-active foam inhibitors are, for example, organopolysiloxanes and mixtures thereof with microfine, optionally silanized silica and also paraffins, waxes, microcrystalline waxes and mixtures thereof with silanized silica or bis-stearyl ethylenediamide. Mixtures of various foam inhibitors, for example mixtures of silicones, paraffins or waxes, are also used with advantage. The foam inhibitors, more particularly silicone- or paraffin-containing foam inhibitors, are preferably fixed to a granular water-soluble or water-dispersible support. Mixtures of paraffins and bis-stearyl ethylenediamides are particularly preferred.

Suitable enzymes are those from the class of proteases, lipases, amylases, cellulases and mixtures thereof. Enzymes obtained from bacterial strains or fungi, such as *Bacillus subtilis, Bacillus licheniformis* and *Streptomyces griseus,* are particularly suitable. Proteases of the subtilisin type are preferably used, proteases obtained from *Bacillus lentus* being particularly suitable. Enzyme mixtures, for example mixtures of protease and amylase or protease and lipase or protease and cellulase or mixtures of cellulase and lipase or mixtures of protease, amylase and lipase or protease, lipase and cellulase, but especially cellulase-containing mixtures, are of particular interest. Peroxidases have also proved to be suitable in some cases. The enzymes may be adsorbed to supports and/or encapsulated in shell-forming substances to protect them against premature decomposition. The percentage content of enzymes, enzyme mixtures or enzyme granules may be, for example, of the order of 0.1 to 5% by weight and preferably from 0.1 to around 2% by weight.

Suitable stabilizers, particularly for per compounds and enzymes, are the salts of polyphosphonic acids, more particularly 1-hydroxyethane-1,1-diphosphonic acid (HEDP), diethylenetriamine pentamethylenephosphonic acid (DETPMP) or ethylenediamine tetramethylenephosphonic acid.

The function of redeposition inhibitors is to keep the soil detached from the fibers suspended in the wash liquor and thus to prevent discoloration. Suitable redeposition inhibitors are water-soluble, generally organic colloids, for example the water-soluble salts of polymeric carboxylic acids, glue, gelatine, salts of ether carboxylic acids or ether sulfonic acids of starch or cellulose or salts of acidic sulfuric acid esters of cellulose or starch. Water-soluble polyamides containing acidic groups are also suitable for this purpose. Soluble starch preparations and other starch products than those mentioned above, for example degraded starch, aldehyde starches, etc., may also be used. Polyvinyl pyrrolidone is also suitable. However, cellulose ethers, such as carboxymethyl cellulose (Na salt), methyl cellulose, hydroxyalkyl cellulose, and mixed ethers, such as methyl hydroxyethyl cellulose, methyl hydroxypropyl cellulose, methyl carboxymethyl cellulose and mixtures thereof, and polyvinyl pyrrolidone may also be used, for example in quantities of 0.1 to 5% by weight, based on the detergent.

The detergents may contain derivatives of diaminostilbene disulfonic acid or alkali metal salts thereof as optical brighteners. Suitable optical brighteners are, for example, salts, of 4,4'-bis-(2-anilino-4-morpholino-1,3,5-triazinyl-6-amino)-stilbene-2,2'-disulfonic acid or compounds of similar composition which contain a diethanolamino group, a methylamino group, an anilino group or a 2-methoxyethylamino group instead of the morpholino group. Brighteners of the substituted diphenyl styryl type, for example alkali metal salts of 4,4'-bis-(2-sulfostyryl)-diphenyl, 4,4'-bis-(4-chloro-3-sulfostyryl)diphenyl or 4-(4-chlorostyryl)4'-(2-sulfostyryl)-diphenyl, may also be present. Mixtures of the brighteners mentioned above may also be used.

The tablets according to the invention - whether detergent tablets or cleaning tablets or additives for detergents or cleaners - may consist of several components, as described in patent application WO-A-90102165. Accordingly, it is preferred to produce the tablets by mixing at least two powder-form to granular components prepared beforehand and then to tablet the resulting mixture, one component containing the total quantity of anionic surfactants and the other component containing 75 to 100% by weight of the total quantity of nonionic surfactants. Other components may also be used to produce the tablets, including in particular bleaching agents and/or bleach activators or even—for example—enzymes, defoamers and fragrances.

However, the various components need not be made up into a single-layer tablet, instead they may be made up into tablets containing several layers, i.e. at least two layers. These various layers may also have different dissolving rates. This can provide the tablets with favorable performance properties. If, for example, the tablets contain components which adversely affect one another, one component may be integrated in the fast-dissolving layer while the other component may be incorporated in a more slowly dissolving layer so that the first component has reacted off by the time the second passes into solution. In another preferred embodiment of the invention, a tablet consists of at least three layers, i.e. two outer layers and at least one inner layer, at least one of the inner layers containing a peroxy bleaching agent while the two outer layers are free from peroxy bleaching agent. In addition, it is also possible in this way spatially to separate peroxy bleaching agents and any bleach activators and/or enzymes present from one another in one and the same tablet. Corresponding multilayer tablets have the advantage that not only can they be introduced into the washing process through a dispensing compartment or a metering device introduced into the wash liquor, instead it is also possible in cases such as these to introduce the tablet into the machine in direct contact with the fabrics without any danger of staining by bleaching agents and the like.

Finally, the present invention also relates to a washing process in which several, but at least two, tablets with the same or different composition are used for a single wash cycle. In particular, it is possible in this regard to combine tablets on the building block principle. This means that, for example, one tablet is used as a basic detergent in a wash cycle, this tablet containing in particular surfactants and the silicates used in accordance with the invention and also other ingredients of typical detergents or cleaners except bleaching agents. A water-softening tablet and/or a bleaching tablet may then be used in addition to this tablet. The addition of a water-softening tablet may be helpful in areas with very hard tap water while the use of an additional bleaching tablet can be made dependent upon the type of laundry to be washed and the stains to be removed.

The tablet(s) may also be positioned on the washing in the washing machine by means of metering container right at the beginning of the washing process. Since high concentrations of active substances can be present at the beginning of the washing process when little moisture is present, staining of the washing (for example by bleaching agents) cannot be ruled out. This "spotting" effect is avoided, for example, by making the metering container in the form of a basket. A water-permeable sieve-like or net-like holder for the tablets is situated inside the basket. The outer basket prevents direct contact between the tablets and the washing. The sieve-like or net-like holder is of relatively narrow mesh so that fragments from the basket only pass over into the wash liquor in particular when their maximum particle diameter is well below 10 mm and advantageously below 5 mm.

EXAMPLES

The tablets according to the following Examples were produced by initially mixing the corresponding constituents and then tabletting the resulting mixture in a hydraulic press (of the type manufactured by Kurschner, Federal Republic of Germany) under pressures of about 10 to 150 bar.

Example 1

Zeolite-Free Detergent Tablet

A mixture of 8.6% by weight of $C_{12-18}$ fatty alcohol sulfate, 6.5% by weight of $C_{12-18}$ fatty alcohol containing 5 EO, 1% by weight of $C_{12-18}$ sodium fatty acid soap, 29% by weight of crystalline layer-form sodium disilicate (SKS-6®, a product of Hoechst AG, Federal Republic of Germany), 5.2% by weight of sodium carbonate, 0.5% by weight of amorphous sodium silicate ($Na_2O$:$SiO_2$=1:3.0), 5% by weight of terpolymeric salt of acrylic acid, maleic acid and vinyl alcohol prepared in accordance with German patent application DE-A43 00 772.4, 20,5% by weight of sodium perborate monohydrate, 6.4% by weight of TAED granules, 1% by weight of granular protease, 14% by weight of sodium sulfate, 1% by weight of methyl hydroxypropyl cellulose, salts from solutions and 0.4% by weight of water was tabletted. The water emanated from the raw materials used and was not additionally added. The fatty alcohol sulfate was introduced into the mixture through a compound which had been produced in accordance with German patent application DE-A-41 27 323. The SKS-6® was premixed with the nonionic surfactant and then added to the other constituents. One tablet was sufficient as sole detergent for one wash cycle and had a weight of 80 g. It had a diameter of 38 mm and a thickness of 15 mm.

Example 2

Zeolite-Containing Detergent Tablet

A tablet was produced from a mixture containing 8% by weight of $C_{12-18}$ fatty alcohol sulfate, 6% by weight of C12–18 fatty alcohol . 5 EO, 1% by weight of $C_{12-18}$ sodium fatty acid soap, 11.5% by weight of crystalline layer-form sodium disilicate (SKS-6®), a product of Hoechst AG, Federal Republic of Germany), 15% by weight of zeolite (based on water-free active substance), 5% by weight of sodium carbonate, 0.5% by weight of amorphous sodium silicate ($Na_2O$:$SiO_2$ 1:3.0), 9% by weight of trisodium citrate dihydrate, 20% by weight of sodium perborate tetrahydrate, 6% by weight of TAED granules, 1% by weight of a granular protease, 9% by weight of sodium sulfate, 1% by weight of methyl hydroxypropyl cellulose, 0.5% by weight of carboxymethyl cellulose (CMC), 0.6% by weight of bentonite, 0.15% by weight of a granular silicone-based foam inhibitor, 0.2% by weight of perfume, 0.15% by weight of optical brightener, salts from solutions and 4.4% by weight of water. The water emanated from the raw materials used, more particularly from the powder-form zeolite used, and was not additionally added. The fatty alcohol sulfate was again introduced into the mixture through a compound which had been produced in accordance with German patent application DE-A-41 27 323. The zeolite was used in the form of a spray-dried powder, the slurry to be spray dried additionally containing small quantities of nonionic surfactant, CMC, sodium hydroxide and the bentonite and being additionally charged with the remaining nonionic surfactant. One tablet was sufficient as sole detergent for one wash cycle and had a weight of 80 g, a diameter of 38 mm and a thickness of 15 mm.

Example 3

Water-Softening Tablet

A tablet was produced from a mixture containing 5.7% by weight of sodium carbonate, 67% by weight of SKS-6®, 1% by weight of methyl hydroxypropyl cellulose, 16% by weight of trisodium citrate dihydrate, 8% by weight of a terpolymeric salt of acrylic acid, maleic acid and vinyl alcohol prepared in accordance with German patent application P 43 00 772.4 and subsequent spray drying of a 38% aqueous solution, 0.72% by weight of water from the raw materials used, i.e. not additionally added, 0.5% by weight of sodium sulfate and, for the rest, other salts from the raw materials. The tablet had a diameter of 23 mm, a thickness of 10 mm and a weight of 20 g.

Example 4

Bleaching Tablet

A tablet was produced from a mixture containing 58% by weight of SKS6®, 30% by weight of perborate monohydrate, 10.5% by weight of TAED granules and 1% by weight of methyl hydroxypropyl cellulose. The tablet had a diameter of 23 mm, a thickness of 10 mm and a weight of 20 g.

Example 5

Basic Detergent Tablet

A tablet was produced from a mixture containing 16.5% by weight of $C_{12-18}$ fatty alcohol sulfate, 12.4% by weight of $C_{12-18}$ fatty alcohol . 5 EO, 1.5% by weight of $C_{12-18}$ sodium fatty acid soap, 12% by weight of crystalline layer-form sodium disilicate (SKS-6®, a product of Hoechst AG, Federal Republic of Germany), 20% by weight of zeolite (based on water-free active substance), 2% by weight of Sokalan CP5®, 10% by weight of sodium carbonate, 0.5% by weight of amorphous sodium silicate ($Na_2O$:$SiO_2$ 1:3.0), 1.5% by weight of a granular protease, 10% by weight of sodium sulfate, 1% by weight of methyl hydroxypropyl cellulose, 1% by weight of carboxymethyl cellulose (CMC), 1.3% by weight of bentonite, 0.7% by weight of a granular silicone-based foam inhibitor, 0.2% by weight of perfume, 0.15% by weight of optical brightener, salts from the raw materials used and 6.2% by weight of water. The water originated from the raw materials used, more especially from the powder-form zeolite used, and was not additionally added. The fatty alcohol sulfate was again introduced into the mixture through a compound which had been produced in accordance with German patent application DE-A-41 27 323. The zeolite was used in the form of a spray-dried powder, the slurry to be spray dried additionally containing small quantities of nonionic surfactant, CMC, sodium hydroxide and the bentonite. One tablet weighed 40 g and had a diameter of 35 mm and a thickness of 10 mm.

Example 6

Building Block System of Tablets

One tablet produced in accordance with Example 3, a second produced in accordance with Example 4 and a third produced in accordance with Example 5 were used in one wash cycle.

We claim:

1. A tablet composition containing builders consisting essentially of 2% to 80% by weight of a mixture of X-ray-amorphous silicates and crystalline or partly crystalline layer-form sodium silicates corresponding to the formula $Na_2\ Si_x\ O_{2x+1}.yH_2O$ wherein x is a number of 1.9 to 4 and y is a number of 0 to 20 and 5% to 80% by weight of water-containing zeolite or phosphate, with the proviso that said tablet composition only contains water in a quantity such that the maximum theoretical water-binding capacity of the components of said composition is not exceeded, and said crystalline layer-form sodium silicates and X-ray-amorphous silicates are present in a ratio by weight of 10:1 to 1:10.

2. A tablet composition as in claim 1 which is free from amorphous silicates of the waterglass type.

3. A tablet composition as claimed in claim 1 present in overdried form.

4. A tablet composition as in claim 1 containing 5% to 60% by weight of said mixture of X-ray-amorphous and partly crystalline or crystalline layer-form sodium silicates.

5. A tablet composition as in claim 1 further containing disintegrating agents or tabletting aids.

6. A tablet composition as in claim 1 further containing up to 40% by weight of anionic surfactants or soaps.

7. A tablet composition as in claim 1 further containing up to 20% by weight of nonionic surfactants.

8. A tablet composition as in claim 1 further containing at least two powder-form or granular components wherein one of said components contains anionic surfactants and the other of said components contains 75% to 100% by weight of nonionic surfactants.

9. A tablet composition as in claim 1 in the form of at least two layers optionally dissolving at different rates.

10. A tablet composition as in claim 1 in the form of at least three layers wherein a peroxy bleaching agent is present in at least one of said layers.

11. A tablet composition as in claim 1 wherein said mixture of X-ray-amorphous and partly crystalline or crystalline layer-form sodium silicates corresponding to said formula is present in an amount from 20% to 80% by weight, wherein said builder further consists essentially of 0.5% to 30% by weight of polycarboxylates, 0.5% to 12% by weight of polymeric polycarboxylates and wherein said tablet composition further contains 0.5% to 20% by weight of anionic surfactants, nonionic surfactants, alkaline or neutral inorganic salts and mixtures thereof.

12. A tablet composition as in claim 1 containing 20% to 80% by weight of said mixture of X-ray-amorphous and partly crystalline or crystalline layer-form sodium silicates corresponding to said formula and further containing 20% to 50% by weight of peroxy bleaching agents, and no zeolite.

13. The process of producing the tablet composition of claim 1 comprising mixing the individual ingredients which are made up at least partly in the form of a granular compound, and tabletting the mixture under pressure.

14. A process as in claim 13 wherein the tabletting step is carried out in the absence of water.

15. A process as in claim 13 wherein roll-compacted crystalline layer-form sodium disilicates, which are optionally impregnated with liquid to wax-like components, are present as the granular compound.

16. A process as in claim 13 wherein before said tabletting step, producing at least two powder-form or granular compounds, the first of which contains the total quantity of anionic surfactants while the second contains 75% to 100% by weight of the total quantity of nonionic surfactants.

17. A process as in claim 13 wherein said tablet is produced from at least two layers optionally dissolving at different rates.

18. A process as in claim 13 wherein said tablet is produced from at least three layers, at least one of the layers containing a peroxy bleaching agent.

19. A washing process wherein the tablet composition of claim 1 is used in a single wash cycle.

20. A washing process as in claim 19 wherein said tablet is positioned in a washing machine by means of a metering container located at the beginning of the wash process.

* * * * *